UNITED STATES PATENT OFFICE.

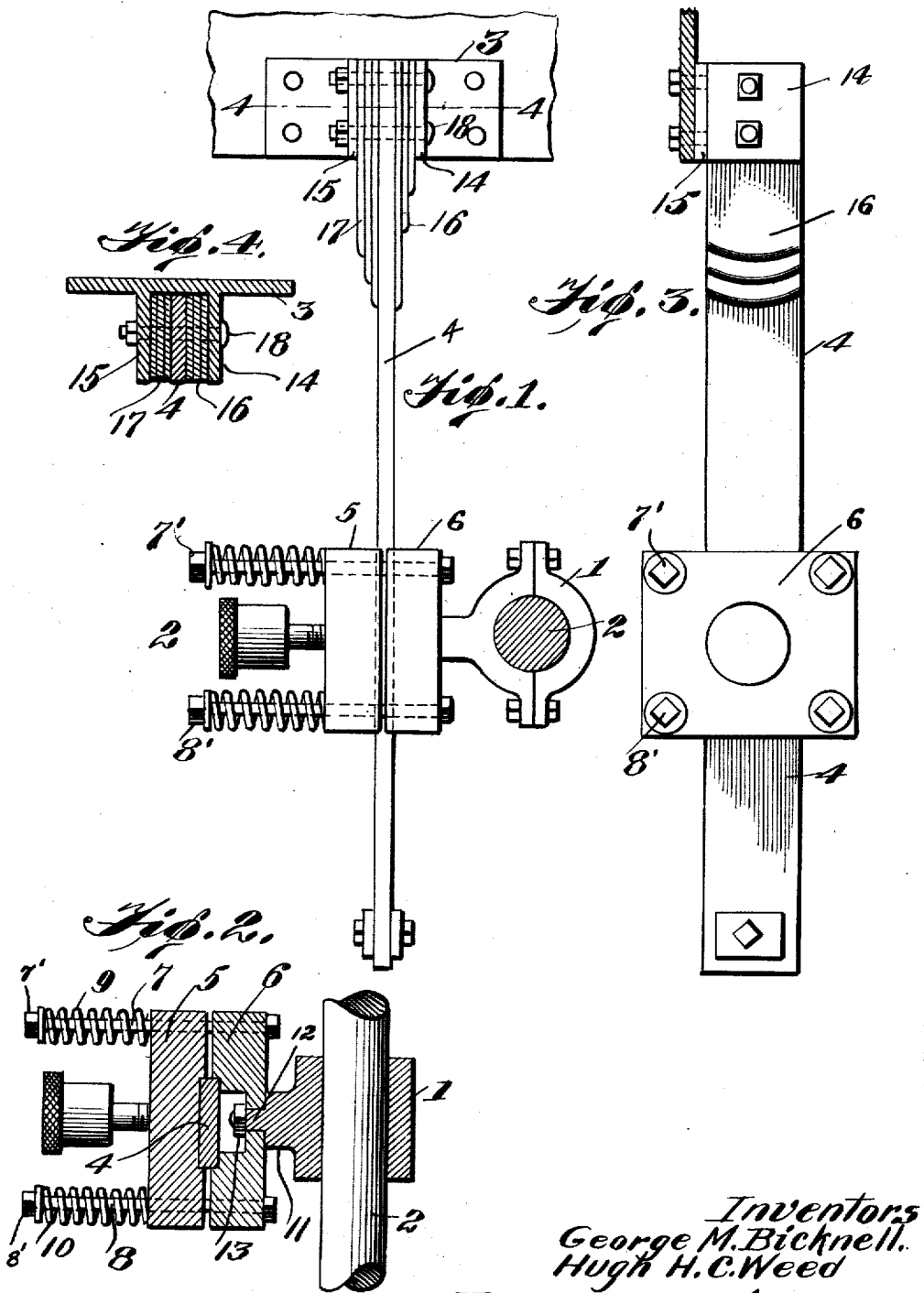

GEORGE M. BICKNELL, OF DETROIT, MICHIGAN, AND HUGH H. C. WEED, OF ST. LOUIS, MISSOURI, ASSIGNORS TO THE CARTER CARBURETER COMPANY, OF ST. LOUIS, MISSOURI, A CORPORATION OF MISSOURI.

FLOATING BEARING.

1,300,556.        Specification of Letters Patent.     Patented Apr. 15, 1919.

Application filed July 15, 1918. Serial No. 245,005.

*To all whom it may concern:*

Be it known that we, GEORGE M. BICKNELL and HUGH H. C. WEED, citizens of the United States, and residing at Detroit, in the county of Wayne, Michigan, and at St. Louis, in the county of St. Louis, Missouri, respectively, have invented certain new and useful Improvements in Floating Bearings, of which the following is a specification.

This invention relates to attachments for bearings adapted for application to rotating shafts, and more particularly to shafts which are subjected to high speed rotation. The primary object of the invention is the prevention of the whipping of shafts.

The generally accepted idea of the so-called whipping is the tendency of high speed shafting to travel, in response to centrifugal force, in a circle larger than the diameter of the shaft. This circular travel is in addition to the rotation of the shaft under applied power. The shafts are ordinarily held in fixed bearings, generally at least two in number, and the portions of the shaft which are subjected to the whipping action are located between the fixed bearings. The circle of travel of the whipping portions would manifestly be around a center which is the center of the shaft when it is at rest.

It will be very readily understood that the whipping action is exceedingly destructive to the fixed bearings and to the shaft itself.

As before stated, a whipping shaft travels in a circle larger than its own diameter. Our conception is that any discouragement of the tendency of the shaft to travel in a true circle, by destroying or retarding its continuity of movement, or impulse in a fixed circular direction, will tend to cause the shaft to more nearly assume its normal straight alinement.

The invention is especially adapted for automobile shafting but it is to be clearly understood that it may be advantageously used on any high speed shafts. In automobile drive shafts a very large percentage of the destructive wear on universal joints is occasioned by shaft whipping. This wear has caused the adoption of heavier drive shafts, of abnormal diameter, which manifestly do not whip to so great an extent, because less resilient, but has occasioned a very material increase in cost of production. These heavier shafts are also objectionable in that they add to the burden of the universal joint. With the use of our invention, a long drive shaft of normal diameter will show a smaller degree of whipping tendency, and consequently cause less wear upon the bearings, than will a shaft of the same length and of abnormally large diameter.

We have observed that the whipping action is better retarded by opposing unequal resistance to the tendency of the shaft to swing in a circle. A fixed resistance of the tendency to travel to the left, for instance, should be met by either a greater or less resistance to travel to the right. Moreover, it is obvious that, in order for the shaft to travel in a circular path, the whipping portion must move upwardly and downwardly, at some point in the circle. This resistance may be applied as desired, but it is to be noted that, if equal resistance is moderately applied to movement in all directions, the whipping action will not be entirely eliminated.

Our invention therefore, by providing unequal resistance to shaft movement in different directions, renders a true circular or "whipping" movement impossible, offering at the same time no resistance to the rotative movement within the bearings.

In the accompanying drawings forming a part of this specification, we have illustrated a preferred embodiment of our invention, and have chosen to illustrate the invention applied to the drive shaft of an automobile.

In the drawings—

Figure 1 is a plan view of the device applied to the drive shaft, which is shown in section;

Fig. 2 is a sectional view showing the connection between the shaft bearing and the resistance device;

Fig. 3 is a side elevation of Fig. 1; and

Fig. 4 is a sectional detail on the line 4—4 of Fig. 1.

The invention comprises preferably a split bearing 1, adapted to surround the shaft 2. A bracket 3 is fixed to any convenient part of the automobile, such as a cross-member, and adapted to support a depending bar 4 in a position immediately adjacent the bearing 1. The bar 4 is formed of a single piece of metal having an inherent resiliency.

Embracing the bar 4 are two metallic plates 5 and 6, suitably recessed or grooved to fit said bar. Bolts 7 and 8 extend through both plates, the ends thereof projected from the plate 5, being surrounded by coiled springs 9 and 10 which constantly exert a pressure tending to clamp the plates upon the bar 4, as will be readily understood from inspection of Fig. 2. Adjusting nuts 7' and 8' are fitted to the outer ends of the bolts 7 and 8, respectively, whereby the clamping action may be regulated, as will be readily understood.

The bearing 1 is, preferably integrally, provided with a shank 11, having a reduced portion 12 extending through an aperture in the plate 6. The inner end of the portion 12 is screw-threaded and carries a nut 13. It will therefore be noted that the plates 5 and 6 form a collar which is connected to the bearing 1.

The bracket 3 is preferably formed of angle iron having flanges 14 and 15 which forms a pocket within which extends the end of the bar 4. It is to be noted that, since the collar is connected to the bearing 1, any bodily movement of the latter to the right or left will flex the bar 4. In order to provide an unequal resistance to lateral flexure of the bar 4, and to also prevent any shearing thereof by its contact with the lower edges of the flanges 14 and 15, we mount two leaf springs 16 and 17 between the flanges 14 and 15, as shown in Figs. 1 and 4. It will be noted that the bar 4 is received between the springs, and that a bolt 18 passes through the springs and bar. The springs 16 and 17 are of unequal tensile strength, and extend downwardly beyond the flanges 14 and 15, along the bar 4. They may be of the same tensile strength and one extend downwardly farther than the other. It is important that they do not impart the same amount of resistance to flexure of the bar.

From the foregoing it is clear that resistance is always applied to any whipping tendency of the shaft. Any movement of the shaft to either side is resisted by the resiliency of the bar 4, but, in the absence of other instrumentalities, this resistance would be the same in both directions. The springs 16 and 17 however, since they are of different strength, are utilized to impart the unequal resistance, and also to prevent the shearing of the bar 4, as hereinbefore referred to.

It is clear that vertical movement of the shaft cannot take place except the collar, formed by the plates 5 and 6, slide along the bar 4. Since the springs 9 and 10 are always forcing the plates 5 and 6 into clamping engagement with bar 4, this vertical movement of the shaft is frictionally resisted.

From the foregoing, it will be clear that we have devised a novel means adapted to effectually prevent the central line of the shaft assuming a circular path of travel, thereby causing said shaft to maintain its substantial alinement.

It is obvious that in actual practice of the invention, lubricating devices, such as oil cups, should be applied to all points where there is frictional contact. Since these devices form no part of our invention, they are not shown in all instances where they would be necessary.

Various modifications of the invention may be suggested to those skilled in the art to which the invention appertains, but we desire to secure by Letters Patent all such embodiments thereof as fall fairly within the scope of the appended claims.

It is to be understood that, while we have shown a member mounted to assume a vertical position adjacent the shaft, the member might just as well be mounted to extend laterally above or below the shaft. In this event, the lateral movement of the member, the bearing, or the shaft, as herein described, both in the specification and claims, might properly be termed a vertical movement, and vice-versa. The appended claims cover this mechanical equivalent.

What we claim is:—

1. A device of the character described comprising, in combination with a rotatable shaft, a floatable bearing engaging said shaft, a resilient element fixed to assume a position with its free portion adjacent the bearing, and means for connecting said element to said bearing, substantially as described.

2. A device of the character described comprising, in combination with a rotatable shaft, a floatable bearing engaging said shaft, a resilient element fixed to assume a position with its free portion adjacent the bearing, means for presenting resistance to flexure of said element, and means for connecting said element to said bearing, substantially as described.

3. A device of the character described comprising, in combination with a rotatable shaft, a floatable bearing engaging the shaft, a resilient element fixed in position adjacent said bearing, means for connecting the element to said bearing, and means for presenting resistance to flexure of said element in opposite directions, said means also operating to prevent shearing of the element, substantially as described.

4. A device of the character described comprising, in combination with a rotatable shaft, a floatable bearing engaging the shaft, a resilient element fixed in position adjacent said bearing, means for connecting the element to said bearing, and means for presenting unequal resistance to flexure of said element in opposite directions, said means also operating to prevent shearing of the element, substantially as described.

5. A device of the character described comprising, in combination with a rotatable shaft, a floatable bearing engaging the shaft, a resilient element fixed in position adjacent said bearing, means for connecting said element to said bearing, and a leaf spring clamped to and engaging each side of the fixed portion of said element, whereby the degree of flexure of said element is controlled, and shearing thereof prevented, substantially as described.

In testimony whereof we affix our signatures.

GEORGE M. BICKNELL.
HUGH H. C. WEED.

Copies of this patent may be obtained for five cents each, by addressing the "Commissioner of Patents, Washington, D. C."